US006771829B1

(12) United States Patent
Topiwala et al.

(10) Patent No.: US 6,771,829 B1
(45) Date of Patent: Aug. 3, 2004

(54) METHOD FOR LOCAL ZEROTREE IMAGE CODING

(75) Inventors: Pankaj N. Topiwala, Clarksville, MD (US); Trac D. Tran, Columbia, MD (US)

(73) Assignee: Fastvdo LLC, Columbia, MD (US)

(*) Notice: Subject to any disclaimer, the term of this patent is extended or adjusted under 35 U.S.C. 154(b) by 0 days.

(21) Appl. No.: 09/694,202

(22) Filed: Oct. 23, 2000

Related U.S. Application Data

(60) Provisional application No. 60/161,149, filed on Oct. 23, 1999.

(51) Int. Cl.[7] .................................................. G06K 9/36
(52) U.S. Cl. ........................ 382/240; 382/232; 382/248
(58) Field of Search ................................ 382/240, 248, 382/232, 245, 246; 341/79; 375/240.19, 240.11

(56) References Cited

U.S. PATENT DOCUMENTS

| | | | | | |
|---|---|---|---|---|---|
| 5,315,670 | A | * | 5/1994 | Shapiro | 382/232 |
| 5,748,786 | A | * | 5/1998 | Zandi et al. | 382/240 |
| 5,764,805 | A | * | 6/1998 | Martucci et al. | 382/238 |
| 6,069,977 | A | * | 5/2000 | Kim et al. | 382/240 |
| 6,101,279 | A | * | 8/2000 | Nguyen et al. | 382/240 |
| 6,243,496 | B1 | * | 6/2001 | Wilkinson | 382/245 |
| 6,269,192 | B1 | * | 7/2001 | Sodagar et al. | 382/240 |
| 6,381,280 | B1 | * | 4/2002 | Lynch et al. | 375/240.19 |

OTHER PUBLICATIONS

Shapiro, "Embedded Image Coding Using Zerotrees of Wavelet Coefficients", IEEE Transactions on Signal Processing, vol. 41, No. 12, Dec. 1993, pps. 3445–3462.*
Sweldens, "The Lifting Scheme: A Custom–Design Construction of Biorthogonal Wavelets", Appl. Comput. Harmon. Anal, vol. 3, No. 2, Nov. 1994, pps. 1–29.*
Shapiro, "A Fast Technique for Identifying Zerotrees in the EZW Algorithm", IEEE International Conference on Acoustic, Speech, and Signal Processing, vol. 3, 1996, pps. 1455–1458.*
Shapiro, "An Embedded Hierarchical Image Coder Using Zerotrees of Wavelet Coefficients", IEEE Data Compression Conference, 1993, pps. 214–223.*
Antonini et al., "Image Coding Using Wavelet Transform", IEEE Transaction on Image Processing, vol. 1, No. 2, Apr. 1992, pps. 205–220.*
Tran, "The LiftLT: Fast Lapped Transform Via Lifting Steps", ICASSP, Mar. 1999, pps. 1–7.*

* cited by examiner

Primary Examiner—Anh Hong Do
(74) Attorney, Agent, or Firm—Burns & Levinson LLP; Frederick C. Williams; Yan Lan

(57) ABSTRACT

A transform-based image compression framework called local zerotree (LZT) coding partitions the transform coefficients into small groups, each of which is encoded independently using popular zerotree algorithms. The LZT coder achieves similar coding performances as current state-of-the-art embedded coders. The advantage of this coding method is fourfold: (i) because of the reduction of memory buffering, LZT reduces the complexity of the codec implementation and increase the speed of the zerotree algorithm significantly, especially in hardware; (ii) LZT processes large images under limited memory constraint; (iii) LZT supports parallel processing mode as long as the transform in use has that capability; and (iv) LZT facilitates the coding/decoding of regions of interest. The penalty in coding performance is minute compared to global zerotree predecessors in that there are only a few extra bytes of side information. This new coder provides numerous other advantages: faster and simpler hardware implementation, supporting parallel processing mode, facilitating region-of-interest coding/decoding, and capable of processing large images under limited memory constraint. The only properties that LZT sacrifices are full embeddedness and progressive transmission.

6 Claims, 5 Drawing Sheets

METHOD FOR LOCAL ZEROTREE IMAGE CODING

PRIORITY

This application claims the benefit of priority from copending U.S. provisional application 60/161,149, filed Oct. 23, 1999.

FIELD OF THE INVENTION

This invention relates to the processing of images such as photographs, drawings, and other two dimensional displays. It further relates to the processing of such images after they have been captured in digital format or after they have been converted to or otherwise expressed in digital format. This invention further relates to use of novel coding methods to increase the speed and compression ratio for digital image storage and transmission.

BACKGROUND OF THE INVENTION

Recently subband coding has emerged as the leading standardization candidate in future image compression systems due to the development of the discrete wavelet transform (DWT). The multiresolution characteristics of the wavelet transform establish an intuitive foundation on which simple yet sophisticated methods of encoding the transform coefficients are developed. Exploiting the relationship between the parent and the offspring coefficients in wavelet tree, zerotree-based wavelet coders, for example, J. M. Shapiro, "Embedded image coding using zerotrees of wavelet coefficients," *IEEE Trans. on SP*, vol. 41, pp. 3445–3462, December 1993 [hereinafter EZW]; A. Said and W. A. Pearlman, "A new fast and efficient image codec on set partitioning in hierarchical trees,"*IEEE Trans on Circuits Syst. Video Tech.*, vol. 6, pp. 243–550, June 1996 [hereinafter SPIHT]; and "Compression with reversible embedded wavelets," RICOH Company Ltd. submission to ISO/IEC JTC1/SC29/WG1 for the JTC1.29.12 work item, 1995. http://www.crc.ricoh.com/CREW [hereinafter CREW] can effectively order the coefficients by bit planes and transmit more significant bits first. This elegant coding scheme results in an embedded bit stream (i.e., it can be truncated at any point by the decoder to yield the best corresponding reconstructed image) and many other interesting features such as exact bit rate control and idempotency capability. It became apparent that the same idea can be applied to block transform coefficients as well if these are grouped in a wavelet-like octave-band fashion, e.g., Z. Xiong, O. Guleryuz, and M. T. Orchard, "A DCT-based embedded image coder," *IEEE SP Letters*, vol. 3, pp. 289–590, November 1996; H. Malvar, "Lapped biorthogonal transforms for transform coding with reduced blocking and ringing artifacts," *ICASSP97*, Munich, April 1997;] T. Klausutis and V. Madisetti, "Adaptive lapped transform-based image coding," *IEEE SP Letters*, vol. 4, pp. 245–547, September 1997; T. D. Tran and T. Q. Nguyen, "A lapped transform embedded image coder," *ISCAS*, Monterey, May 1998, as illustrated in FIG. 1. Global information is fully taken into account in these subband coders, leading to excellent performance.

However, perfect embeddedness is achieved at a high computational cost. Such embeddedness requires a full buffering of all the transform coefficients. First of all, this requirement becomes burdensome when the input images have high resolution (in desktop publishing applications for example) and/or the decoder has limited resources. Second, a full buffering with multiple passes is very costly in hardware implementation. Finally, full buffering prevents the application of powerful parallel processing techniques.

It is therefore an object of the current invention to sacrifice progressive transmission capability for a faster coder with a lower implementation complexity and a comparable quality performance. It is a further object of the current invention to construct such a coder by partitioning the transform coefficients into small local groups and encoding them independently using popular zerotree-based algorithms. It is yet a further object of this invention to provide a coder with negligible performance penalty. It is another object of this invention to provide a coder with performance almost identical to the fully embedded version when the partition size is reasonably large. It is another object of this invention to maintain embeddedness within the local groups while losing global embeddedness in the final output bitstream.

SUMMARY OF THE INVENTION

The LZT coding algorithm of this invention has at least the following fundamental steps:

1) Partitioning the input image into many local blocks. (The size of the partition is chosen based on a tradeoff between the desired level of resolution and the availability of computing resources, which determine an allowable level of implementation complexity.)
2) Transforming each partition, that is, each local block, independently using a block coder. (Some special attention is required at the partition boundaries to ensure continuity in the reconstructed image.)
3) Quantizing the coefficients in each partition by the appropriate JND thresholds or by truncating a certain number of least significant bit planes.
4) Arranging the quantized coefficients in wavelet-like quad-tree fashion as shown in FIG. 2 and encode each group separately using any zerotree coding algorithm.
5) Concatenating the bitstreams to yield the final output.

Most generally, this invention comprises the steps of partitioning the image into a plurality of local blocks, performing a block coding transform on each local block of the plurality of local blocks so as to produce a corresponding plurality of sets of local block transform coefficients using a block coding algorithm, quantizing the local block transform coefficients in each set of local block transform coefficients of the plurality of local block transform coefficients, arranging the plurality of sets of quantized local block transform coefficients in a wavelet-like quad-tree structure, and concatenating the bit-streams of the encoded quantized coefficients from each of the plurality of local blocks.

DESCRIPTION OF THE PREFERRED EMBODIMENT

Figure 1:
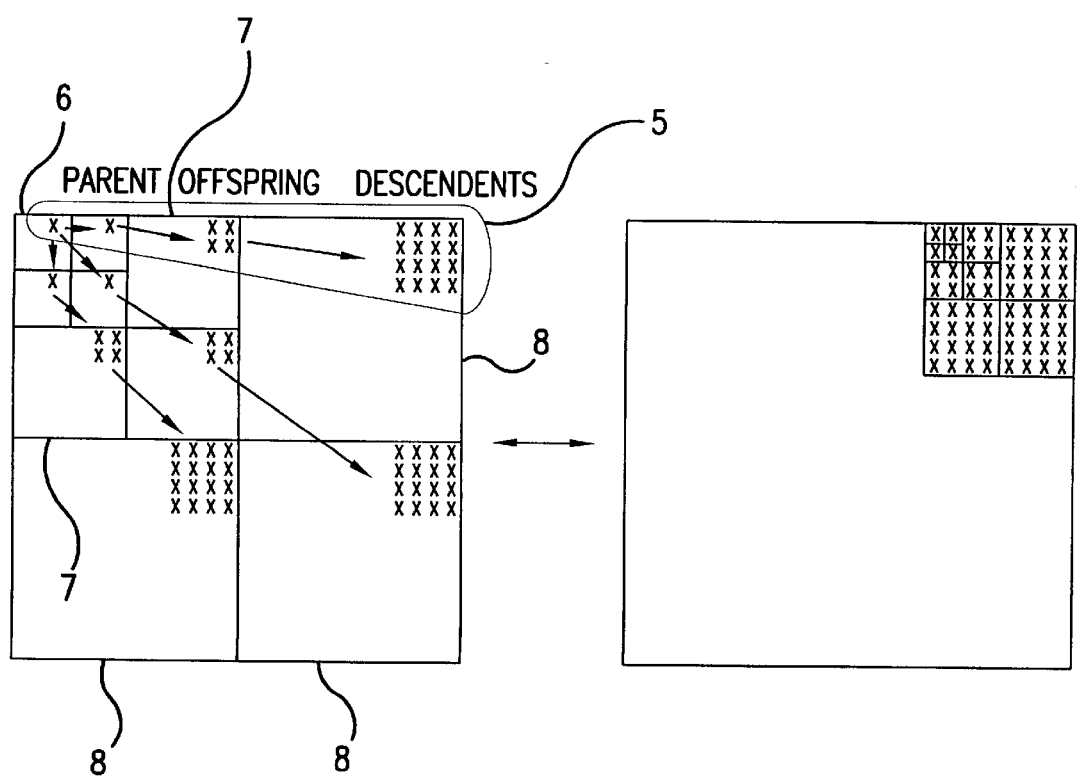
FIG. 1(*a*) is a block diagram of a method for coding a digital image of the present invention.
Figure 1A:
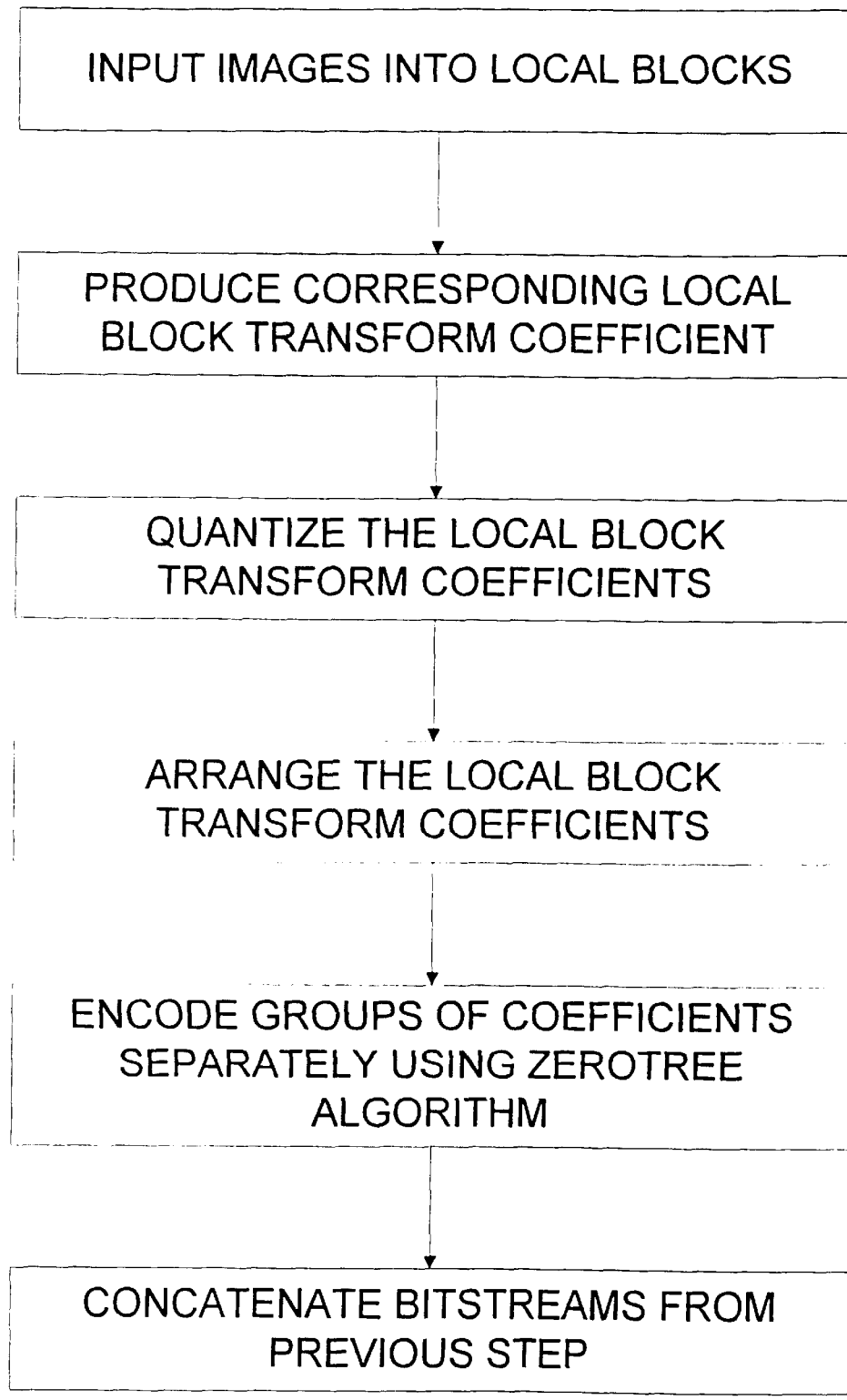
FIG. 1A is a flow diagram of the coding process.

Embedded coding algorithms rely on the hierarchical tree structure of coefficients called a wavelet tree, defined as a set of wavelet coefficients from different scales that belong in the same spatial locality as demonstrated in FIG. 1, where the tree in the horizontal direction 5 is circled. All of the coefficients in the lowest frequency band make up the DC band or the reference signal (located at the upper left corner) 6. Besides these DC coefficients, in a wavelet tree of a particular direction, each lower-frequency parent node has four corresponding higher-frequency offspring nodes 7. All coefficients below a parent node in the same spatial locality is defined as its descendants 8. In this invention a coefficient $c_{ij}$ is defined to be significant with respect to a given threshold T if $c_{ij} \geq T$, and insignificant otherwise. Review of image statistics has shown that if a coefficient is insignificant, it is very likely that its offspring and descendents are insignificant as well. Exploiting this fact, sophisticated embedded zerotree coders can output a single binary marker to represent very efficiently a large, smooth image area (an insignificant tree). The details of zerotree algorithms are known in the art and can be found in such publications as EZW, SPIHT, and CREW.

The key to the high efficiency of zerotree coders is accuracy in predicting the correlation between coefficients in the same spatial locality. Observation shows minimal correlation between far-apart coefficient trees. Thus a zerotree algorithm can capture very high coding performance when local groups of coefficient trees are encoded independently.

Classic bit allocation must also be taken into account in local zerotree coding. Alternate solutions are available to distribute the bit budget appropriately between the local groups of coefficients. On the one hand, embedded zerotree coders can employ a very simple quantization scheme—all subbands are scalar-quantized by a single step-size. Hence, prior to the encoding step, the same number of least significant bit planes of all coefficients from all LZT groups are truncated. On the other hand, the method can diverge from bit-rate control to quality control in a fashion similar to that of JPEG, W. B. Pennebaker and J. L. Mitchell, JPEG: Still Image Compression Standard, Van Nostrand Reinhold, 1993, where each subband is quantized by a predetermined step-size governed by the response of the human visual system.

Figure 2:
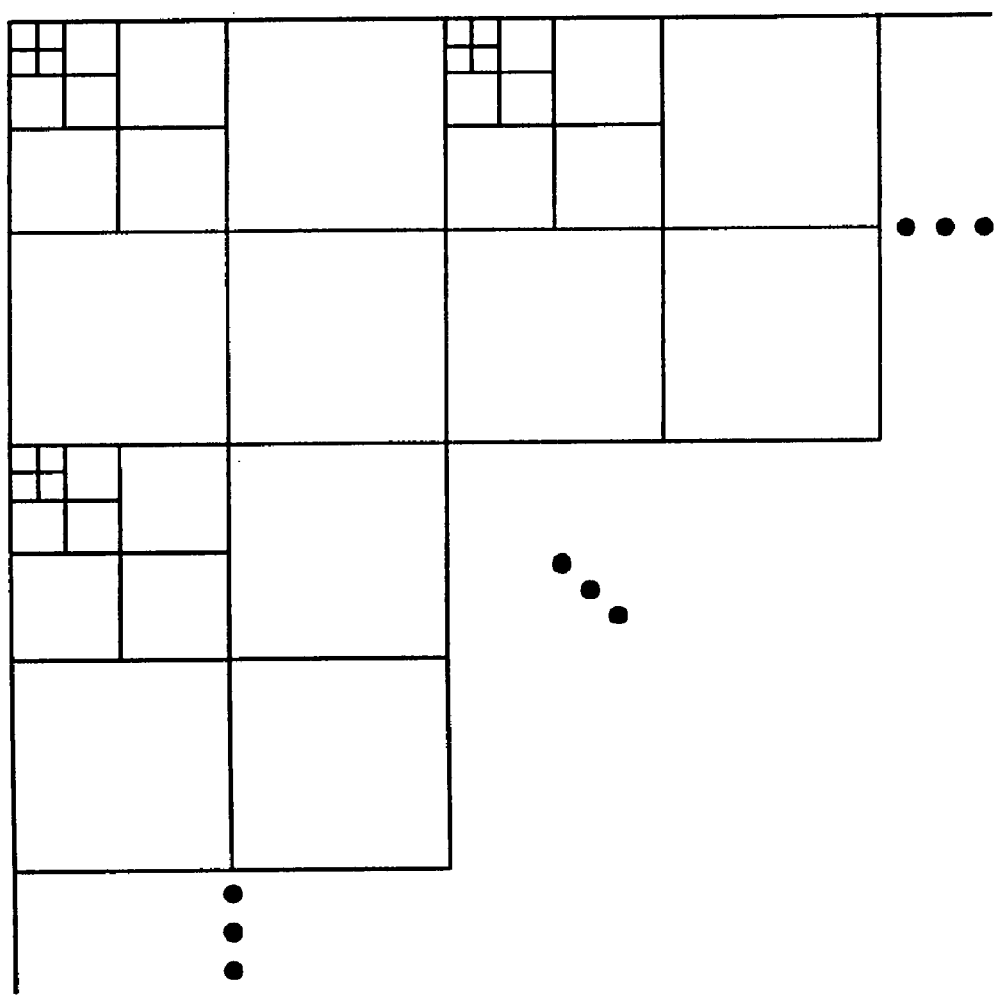
FIG. 2 is a diagram of LZT coding.

The basic LZT structure is shown in FIG. 2. The LZT partitions can be of different shapes and sizes. For example, the image can be encoded in strips. The output bitstream for each LZT partition must include the maximum magnitude of the partition's coefficients (to be used as the initial threshold value by the decoder) and the mean of its DC subband. Furthermore, there must also be a special END-OF-BLOCK marker to inform the decoder of the boundary between different LZTs. Encoding these values takes a small number of extra bytes. The side information needed for LZT coding is negligible unless the LZT block size becomes small. Another interesting feature that LZT can support is region-of-interest coding/decoding: the LZT partitions can be quantized with different step sizes resulting in different levels of reproducibility.

Figure 3:
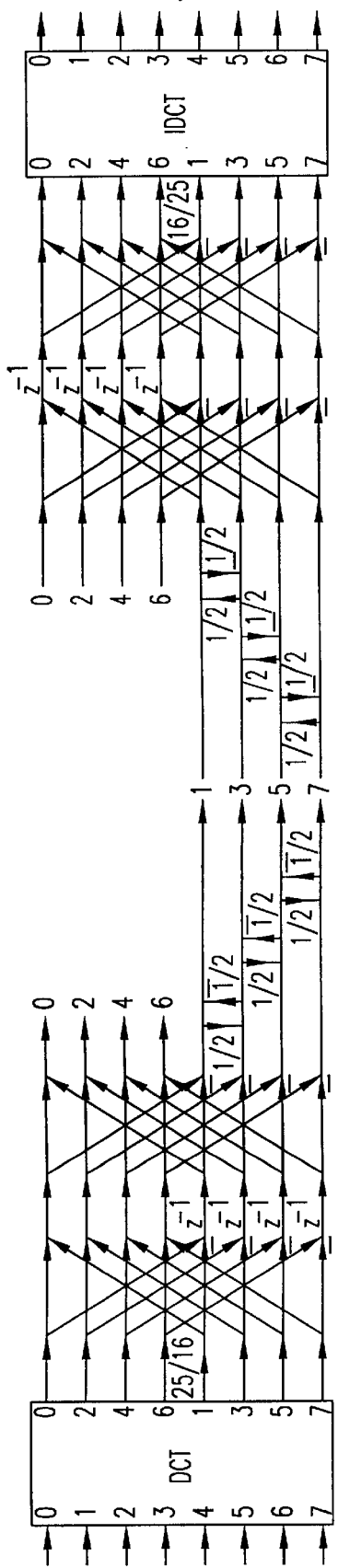
FIG. 3 illustrates the LiftLT analysis/synthesis lattice.

Since LZT is primarily a block coding algorithm, the ideal candidates at the transform stage are block transforms. The DCT is inappropriate since its non-overlapping basis creates blocking artifacts between 8×8 coefficient blocks as well as between larger LZT partitions. In the current preferred embodiment of this invention, we employ a high-performance 8×16 lapped transform with integer coefficients called the LiftLT, T. D. Tran, "The LiftLT: fast lapped transforms via lifting steps," submitted to ICASSP, Phoenix, March 1999, whose fast and efficient implementation is depicted in FIG. 3. This transform is also described in a prior patent application by the current inventors, Tran, Trac D. and Topiwala, Pankaj, "Fast Lapped Image Transforms Using Lifting Steps," U.S. patent application Ser. No. 09/212,210, filed Dec. 12, 1998, which is incorporated by reference as though fully set forth herein. The small 8-pixel overlap facilitates the manipulation of LZT boundaries. The well known discrete wavelet transform can be used as well. However, to minimize the LZT's buffering size, this invention must use efficient block-based implementations such as C. Chrysafis and A. Ortega, "Line based reduced memory wavelet image compression," Proc. DCC98, Snowbird, Utah, March 1998; P. Cosman and K. Zeger, "Memory constrained wavelet-based image coding," *IEEE SP Letters*, vol. 5, September 1998.

Table 1 sets forth numerical comparison of the coder of this invention with fully embedded coders. For fair comparison, the same SPIHT quantizer and entropy coder are utilized to transfer the coefficients in all coding schemes. The coders in comparison (with the associated transforms) are:
1. 64×64 LZT coder, 8×16 LiftLT
2. 128×128 LZT coder, 8×16 LiftLT
3. 256×256 LZT coder, 8×16 LiftLT
4. fully embedded LT coder, 8×16 LiftLT
5. 64×64 LZT coder, 9/7-tap wavelet
6. fully embedded SPIHT coder, 9/7-tap wavelet.

TABLE 1

| Coding Algorithm | LZT | LZT | LZT | EZ-LT | LZT | SPIHT |
|---|---|---|---|---|---|---|
| Local Block Size | 64 × 64 | 128 × 128 | 256 × 256 | — | 64 × 64 | — |
| Transform | 8 × 16 LT | 8 × 16 LT | 8 × 16 LT | 8 × 16 LT | 9/7 WL | 9/7 WL |
| Barbara | | | | | | |
| Output Bytes | 7869 | 6908 | 6623 | 6601 | 5847 | 5177 |
| Comp. Ratio | 33.32:1 | 37.95:1 | 39.58:1 | 39.71:1 | 44.83:1 | 50.64:1 |
| PSNR | 28.11 | 28.07 | 28.06 | 28.06 | 25.87 | 25.87 |
| Goldhill | | | | | | |
| Output Bytes | 10806 | 9939 | 9558 | 9395 | 8065 | 7209 |
| Comp. Ratio | 24.26:1 | 26.38:1 | 27.43:1 | 27.90:1 | 32.50:1 | 36.36:1 |
| PSNR | 31.17 | 31.15 | 31.15 | 31.15 | 30.14 | 30.17 |
| Lena | | | | | | |
| Output Bytes | 8599 | 7688 | 7352 | 7281 | 6428 | 5570 |
| Comp. Ratio | 30.49:1 | 34.10:1 | 35.66:1 | 36.00:1 | 40.78:1 | 47.06:1 |
| PSNR | 33.49 | 33.46 | 33.43 | 33.47 | 32.46 | 32.46 |

Figure 4:
FIG. 4 shows reconstructed 512×512 Barbara images from coding examples compiled in Table 1.

In the lapped transform cases, the modified zerotree structure was used in which each block of transform coefficients were treated analogously to a full wavelet tree. The objective coding results (PSNR in dB) for standard 512×512 Lena, Goldhill, and Barbara test images are tabulated in Table 1. All computed PSNR quotes are obtained from a real compressed bit stream with all overheads included. As expected, the LZT coding performance decreases as the local block size becomes smaller. For LZT of reasonable size (1/16 th of the original image size and up), the amount of side information is negligible. Several reconstructed Barbara images using LZTs of different size and the 8×16 LiftLT are shown in FIG. 4. LZT images are comparable in visual quality to the fully embedded EX-LT coder image. Tope left: 64×64 LZT 10. Top right: 128×128 LZT 11. Bottom left: 256×256 LZT 12. Bottom right: fully embedded EZ-LT coder 13. The boundaries between LZT partitions are imperceptible.

We claim:

1. A method of coding a digital image to produce data compression, comprising the steps of
   a. partitioning the image into a plurality of local blocks;
   b. performing a block coding transform on each local block of the plurality of local blocks so as to produce a corresponding plurality of sets of local block transform coefficients using a block coding algorithm;
   c. quantizing the local block transform coefficients in each set of local block transform coefficients of the plurality of local block transform coefficients;
   d. arranging the plurality of sets of quantized local block transform coefficients in a wavelet-like quad-tree structure of a plurality of groups of coefficients;
   e. encoding each group separately; and
   f. concatenating the bit-streams of the encoded groups of quantized coefficients from each of the plurality of local blocks.

2. The method of claim 1 in which the encoding of each group separately is performed by means of a zerotree coding algorithm.

3. The method of claim 1 in which the block coding transform is a LiftLT transform.

4. The method of claim 1 in which the transform is chosen from the group: discrete wavelet transform; line based reduced memory wavelet image transform; memory constrained wavelet-based image coder; lapped biorthogonal transform.

5. The method of claim 2 in which the zerotree coding algorithms is a bitplane embedded encoding system.

6. The method of claim 2 in which the zerotree coding algorithm is chosen from the group: Shapiro's EZW zerotree algorithm, Said-Pearlman's SPIHT encoding algorithm, and CREW's zerotree algorithm.

* * * * *